(12) United States Patent
Ruff et al.

(10) Patent No.: US 7,711,039 B2
(45) Date of Patent: May 4, 2010

(54) SYSTEM AND METHOD FOR PROTECTING LOW VOLTAGE TRANSCEIVER

(75) Inventors: Alan L. Ruff, Poplar Grove, IL (US); Sarvenaz Bahadori, Chicago, IL (US); Srinivasan S. Iyengar, Hainesville, IL (US); Matthew M. Nakanishi, Libertyville, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 1419 days.

(21) Appl. No.: 11/096,517

(22) Filed: Apr. 1, 2005

(65) Prior Publication Data

US 2006/0222059 A1 Oct. 5, 2006

(51) Int. Cl.
*H04B 1/38* (2006.01)
*H02J 7/00* (2006.01)

(52) U.S. Cl. .................. 375/219; 375/220; 320/134

(58) Field of Classification Search ......... 375/219–220, 375/377; 361/90, 91.1; 455/73, 88, 89, 95, 455/455, 553.1, 343.1, 343.5, 343.6, 117, 455/127.1, 522, 572, 573, 574; D14/155, D14/358, 435.1; 710/106, 313; 320/114, 320/134

See application file for complete search history.

(56) References Cited

U.S. PATENT DOCUMENTS

| | | | |
|---|---|---|---|
| 5,765,110 A * | 6/1998 | Koizumi | 455/445 |
| 5,771,471 A * | 6/1998 | Alberth et al. | 455/573 |
| 6,211,649 B1 * | 4/2001 | Matsuda | 320/115 |
| 6,946,904 B1 * | 9/2005 | Varma et al. | 327/595 |
| 7,170,259 B2 * | 1/2007 | Veselic | 320/114 |
| 7,268,561 B2 * | 9/2007 | Zhu | 324/538 |
| 7,343,147 B2 * | 3/2008 | Ruff et al. | 455/343.1 |
| 2003/0014566 A1 * | 1/2003 | Armitage | 710/1 |
| 2003/0054703 A1 | 3/2003 | Fischer et al. | |
| 2004/0164708 A1 * | 8/2004 | Veselic et al. | 320/132 |
| 2005/0008175 A1 * | 1/2005 | Hagen et al. | 381/314 |
| 2005/0145946 A1 * | 7/2005 | Lee et al. | 257/355 |
| 2005/0189908 A1 | 9/2005 | Guthrie et al. | |
| 2005/0189909 A1 * | 9/2005 | Guthrie et al. | 320/107 |
| 2005/0208963 A1 * | 9/2005 | Shinohara | 455/550.1 |
| 2005/0228934 A1 * | 10/2005 | Tsutsui | 710/313 |
| 2005/0245138 A1 | 11/2005 | Fischer et al. | |
| 2006/0025074 A1 | 2/2006 | Liang et al. | |
| 2008/0119159 A1 * | 5/2008 | Ruff et al. | 455/343.1 |
| 2008/0126594 A1 * | 5/2008 | Monks et al. | 710/17 |

FOREIGN PATENT DOCUMENTS

WO   02075894 A1   9/2002
WO   2004038887 A1   5/2004

* cited by examiner

*Primary Examiner*—Tesfaldet Bocure
*Assistant Examiner*—Lawrence B Williams

(57) ABSTRACT

A transceiver module can share a common connector with a rechargeable battery connection. The transceiver module can be protected from the high voltages applied by a battery charger. Determining when the voltage applied at a connector exceeds a reference voltage and electrically decoupling the transceiver module from the connector when the reference voltage is exceeded can protect the transceiver module. The reference voltage can be set at a level so that the transceiver is decoupled from the connector when the voltage at the connector reaches a voltage that is unsafe for the transceiver.

19 Claims, 3 Drawing Sheets

SYSTEM AND METHOD FOR PROTECTING LOW VOLTAGE TRANSCEIVER

BACKGROUND

1. Field of the Disclosure

The present disclosure relates to electronic systems, and more particularly to electronic systems comprising an integrated circuit transceiver.

2. Description of the Related Art

Hand-held systems typically have a system power connection used to charge a rechargeable battery. Many newer systems support data transfer standards that specify a power connection as part of the standard. The use of a data transfer standard, such as the Universal Serial Bus (USB) Standard, in systems that are independently powered has resulted in the inclusion of at least two power pins on hand-held systems. While it is desirable that these systems be compliant with certain data transfer standards, such as the USB standard, the additional pin count is disadvantageous. Accordingly, it would be advantageous to have a method and system for reducing the number of pins needed by such a system.

BRIEF DESCRIPTION OF THE DRAWINGS

The disclosure is illustrated by way of example and not limitation in the accompanying figures.

DETAILED DESCRIPTION

A transceiver module is disclosed that shares a common connector with a battery charger control module. The transceiver module is powered by a voltage signal applied at the common connector when the voltage is in a safe operating range, and is protected from the high voltages applied to charge a battery when these voltages are outside of a safe operating range. The transceiver module can be protected by determining when the voltage applied at the common connector exceeds a reference voltage and electrically decoupling the transceiver module from the common connector in response to the reference voltage being exceeded. The reference voltage is typically set at a level to allow the transceiver to be electrically decoupled from the connector when the reference voltage being exceeded would result in a condition that is physically unsafe for the transceiver module, or that would result in unreliable operation of the transceiver module.

In one embodiment, the transceiver is deactivated, whereby no power is provided to the transceiver after it is electrically decoupled, placing the transceiver in an indeterminate logic state, while other portions of an integrated circuit on which the transceiver is formed continues to be powered. In another embodiment, the transceiver module is placed in a low power state whereby it is operationally disabled while powered by an alternate source, such as a battery, when electrically decoupled from the common connector. In yet another embodiment, the transceiver module when powered through a battery can remain operational after it is electrically decoupled from the common connector, whereby data can be transferred to and from the transceiver module.

Figure 1:
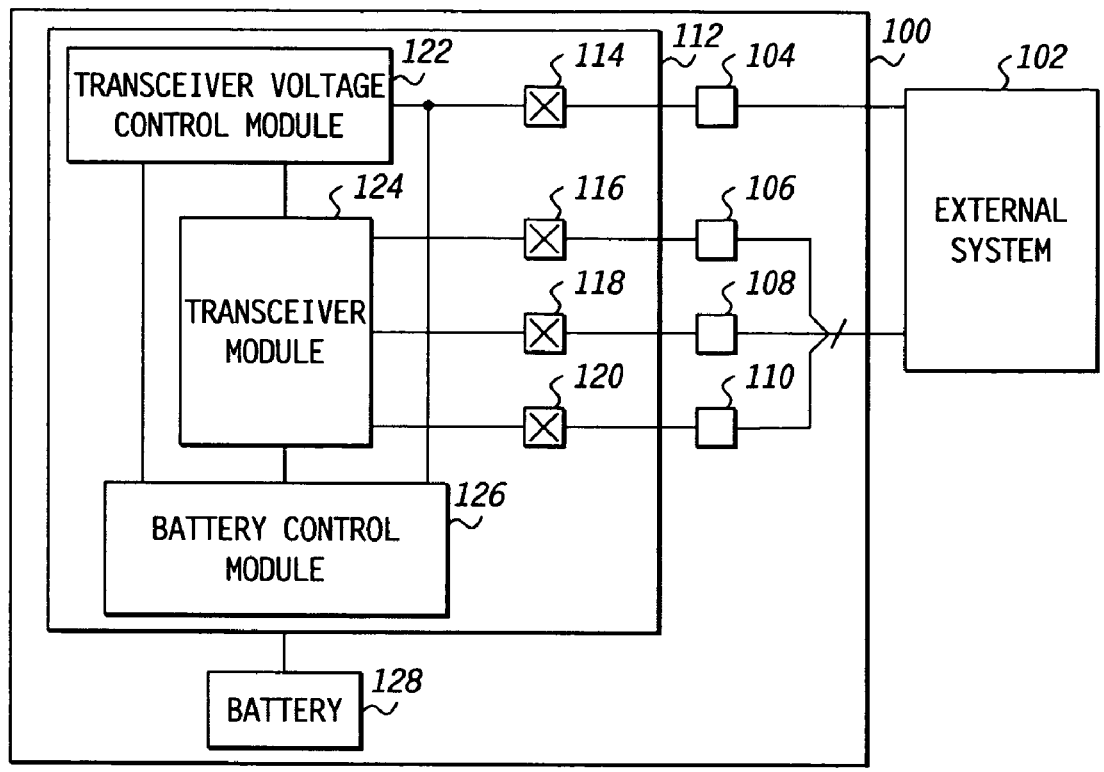
FIG. 1 is a block diagram of the system in accordance with a specific embodiment of the disclosure.

Referring now to FIG 1, an exemplary configuration of a system 100 utilizing a common power connector is illustrated. In the illustrated example, system 100 is connected to an external system 102. The system 100 is typically a hand-held system and may be referred to as hand-held system 100 herein. System 100 may be any of a number of mobile or portable systems, including a mobile phones a personal data assistant (PDA), an audio player, video player, and the like. Furthermore, the term "hand-held" is not limited to systems that are actually held in the hand, but is used herein generically to refer to portable devices designed to be carried by a user during operation so that they may be used on demand. For example, system 100 may include portable systems such as headphones, earpieces and the like.

External system 102 can include any of a number of external systems, including a personal computer (PC), a battery charger, or a system cradle capable of interfacing to other systems, such as a computer. In one embodiment, the external system 102 comprises a battery charger that provides power to hand-held system 100 through connector 104. In another embodiment, external system 102 is a USB compliant system and provides power to system 100 through system connector 104, which corresponds to a USB VBUS node, and transmits and receives data through system connectors 106, 108 and 110. In a third mode of operation, device 102 is a USB compliant system that can be powered by system 100 during a USB on-the-go (OTG) session.

In the illustrated example, system 100 includes an integrated circuit 112 and battery 128. Integrated circuit 112 includes bond pads 114, 116, 118 and 120 which are connected to system connectors 104, 106, 108 and 110 respectively. Integrated circuit 112 is therefore able to receive or provide power between external system 102 through connector 104 and receive and transmit data between external system 102 through data connectors 106, 108 and 110. Integrated circuit 112 is connected to battery 128 through one or more connectors, such as bond pads (not illustrated). In one embodiment, some or all of integrated circuit 112 can receive power from battery 128. Note that bond pads 114-120 and system connectors 104-110 are all generally referred to as connectors, in that they provide an interface to a physically separate structure. For example, the bond pads provide an interface to a substrate, such as a package or printed circuit board substrate, while system connectors can interface to an external plug or cradle.

Integrated circuit 112 includes a transceiver-voltage control module 122, a transceiver module 124, and battery control module 126. In one embodiment, transceiver module 124 can be powered independently of the battery 128 through power pad 114. For example, battery 128 can provide power to portions of the integrated circuit 112, such as battery control module 126, to support their operation while transceiver module 124 is powered through connector 104 during a data transfer session. In one embodiment, transceiver module 124 can be powered down while other portions of the integrated circuit remain powered by the battery 128.

Transceiver-voltage control module 122 is connected to bond pad 114 and transceiver module 124. In the illustrated example, transceiver-voltage control module 122 detects the voltage at bond pad 114. If transceiver-voltage control module 122 detects that the voltage at bond pad 114 exceeds a first voltage value, it will electrically decouple bond pad 114 from transceiver module 124. In another mode of operation, if transceiver-voltage control module 122 detects that the voltage at bond pad 114 is within a valid operating range, transceiver module 124 will be electrically coupled to bond pad 114. For example, when the detected voltage at bond pad 114 is less than the first voltage but greater than a second voltage, transceiver module 124 can be electrically coupled to bond pad 114. In another mode of operation, transceiver-voltage control module 122 electrically decouples transceiver module 124 from bond pad 114 in response to the voltage at bond pad 114 being less than a than the second voltage (i.e., undervoltage condition). In one embodiment, the transceiver module is substantially compliant with the Universal Serial Bus (USB) Specification 2.0,and earlier versions of this specification. In one embodiment the transceiver-voltage control module 122 electrically couples transceiver module 124 when the voltage at bond pad 114 is greater than 0.8 volts but does not exceed 5.8 volts, and electrically decouples transceiver module 124 when the voltage at bond pad 114 is less than 0.8 volts or greater than 5.8 volts.

In an embodiment, transceiver module 124 is capable of transmitting a signal to transceiver-voltage control module 122 requesting that transceiver module 124 be electrically coupled to bond pad 114. This allows transceiver module 124 to initiate a data transmission session where it will provide power to an external system. In a particular embodiment, transceiver module 124 sends a request to the transceiver-voltage control module 122 to electrically couple transceiver module 124 to bond pad 114 in response to a USB OTG session being initiated.

Transceiver module 124 is connected to bond pads 116, 118, and 120 to facilitate communication with external system 102 through these pins.

Battery control module 126 is connected to bond pad 114, battery 128, transceiver module 124 and transceiver-voltage control module 122. Battery control module 126 can charge battery 128 when a sufficiently large voltage has been applied at bond pad 114, and in response sends a signal to transceiver-voltage control module 122 to begin over-voltage detection. Battery control module 126 can also stop charging battery 128 when it is fully charged and shut down its charging portion or place it in a low power mode of operation.

Figure 2:
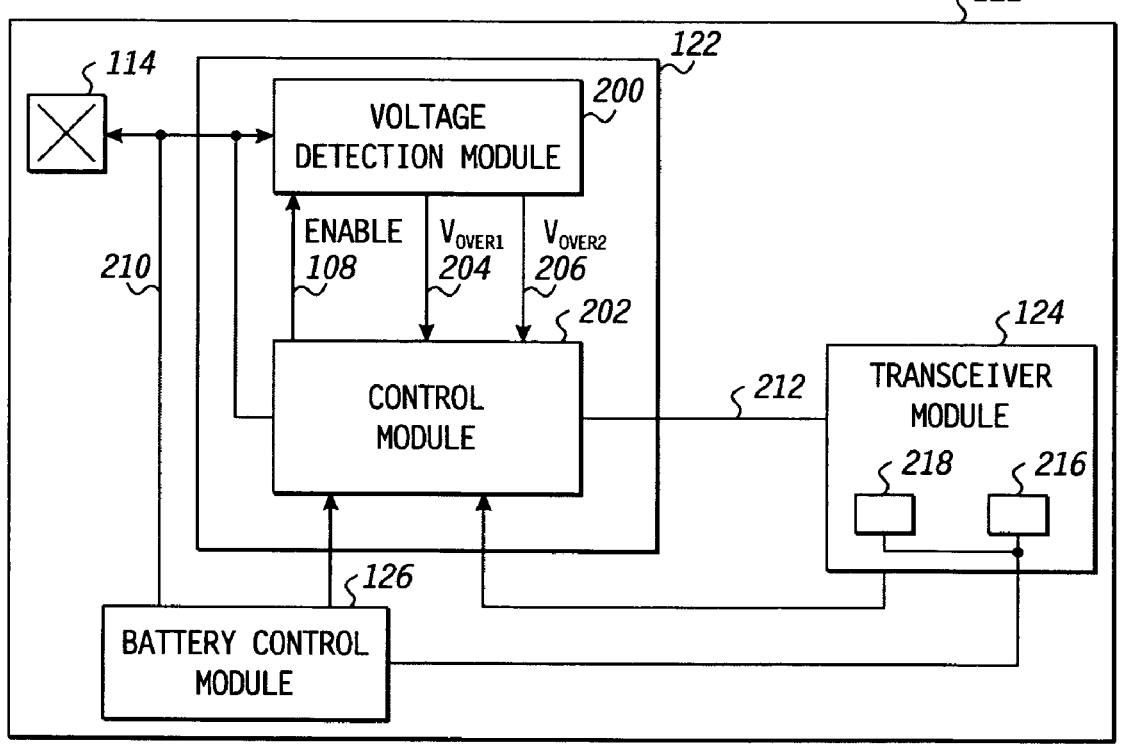
FIG. 2 is a block diagram of a portion of the system in FIG. 1, in accordance with a specific embodiment of the disclosure.

Referring now to FIG. 2, an embodiment of transceiver-voltage control module 122 within hand-held device 100 is illustrated. In the illustrated example, transceiver-voltage control module 122 comprises a voltage detection module 200 and a control module 202. Voltage detection module 200 is connected to bond pad 114, and provides two signals 204 (VOVER1) and 206 (VOVER2) to control module 202. Voltage detection module 200 senses the voltage at bond pad 114. In response to the voltage at bond pad 114 being greater than a first voltage, voltage detection module 200 asserts VOVER1. In response to the voltage at bond pad 114 having a value greater than a second voltage, voltage detection module 200 asserts VOVER2.

In the illustrated example, control module 202 is connected to bond pad 114 via node 210 and an output of control module 202 is connected to transceiver module 124 at node 212. Based on the values VOVER1 and VOVER2, control module 202 electrically couples node 210 to node 212 thereby electrically coupling transceiver module 124 to bond pad 114, or electrically decouples node 210 from node 212 to electrically decouple transceiver module 124 from bond pad 114.

In the illustrated example, control module 202 is connected to battery control module 126 and transceiver module 124.

Control module 202 provides an enable signal 208, labeled ENABLE to enable voltage detection module 200. Transceiver module 124 or battery control module 126 can also send signals to control module 202 for use in determining whether transceiver module 124 will be electrically coupled or decoupled from bond pad 114. In response, control module 202 will assert or negate the ENABLE signal. In an embodiment, battery control module 126 sends a signal to control module 202 asserting the ENABLE signal when the battery control module 202 detects a voltage at bond pad 114 of 3.2 volts or greater. In response to assertion of the ENABLE signal, voltage detection module 200 performs its voltage detection and outputs signals VOVER1 and VOVER2. Enabling of the voltage detection module 200 can be used to place portions of the voltage detection module 200 in a lower power mode when not in use, thereby saving power.

In the illustrated example, battery control module 126 is connected to transceiver module 124 to provide power to the module. Transceiver module 124 includes voltage regulator 216 and voltage regulator 218. Voltage regulator 216 regulates the input voltage from battery control module 126 to an appropriate operating level for transceiver module 124. In an embodiment, voltage regulator 216 regulates the input voltage to a level of 3.2 volts. Voltage regulator 218 regulates the input voltage from battery control module 126 to an appropriate level to provide power to external devices in response to the transceiver module initiating a communication session. In an embodiment, voltage regulator 218 regulates the input voltage to a level of 5 volts, in order to supply this voltage to external devices when transceiver module 124 has initiated a USB on-the-go (OTG) session. In accordance with one embodiment, transceiver 124 is powered through a common connector 114 in one mode of operation and powered through a connector to battery 128 in another mode of operation, such as a USB OTG mode.

Figure 3:
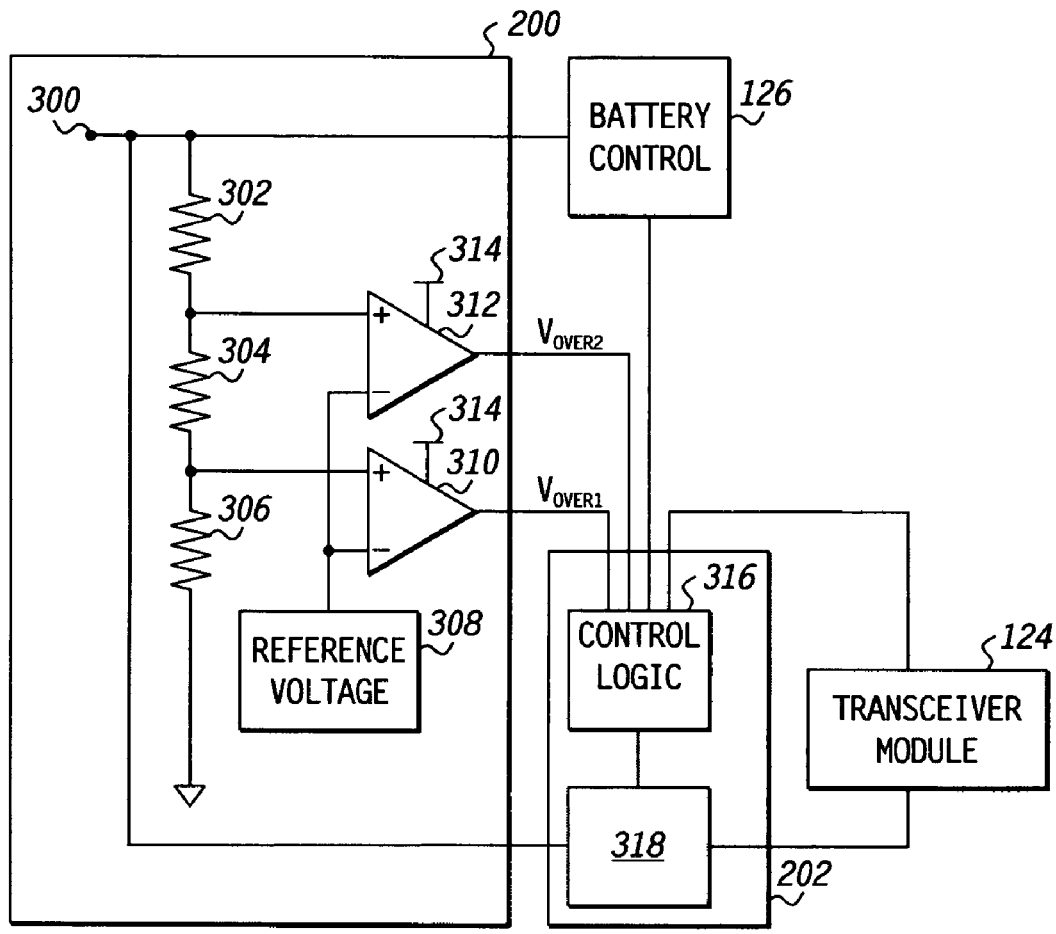
FIG. 3 is a block diagram of a portion of the system illustrated in FIG. 2 in accordance with a specific embodiment of the disclosure.

Referring now to FIG. 3, an exemplary implementation of voltage detection module 200 and control module 202 is illustrated. The voltage at bond pad 114, or a voltage based thereon, is applied at input node 300. This input voltage is then divided by a resistor tree that includes resistors 302, 304 and 306 to provide appropriate input reference values at comparators 310 and 312. The inputs of comparator 310 are connected to a node of the resistor tree between resistors 304 and 306 and to reference voltage 308. Voltage reference module 308 provides a reference voltage that can be based on an on-chip voltage reference, or can be drawn from an external voltage reference. In an embodiment, comparator 310 as implemented acts as a 5.8 volt comparator relative to the system voltage at connector 104 of FIG. 1. Comparator 310 is connected to power supply node 314 (VDD). In an embodiment, a voltage at power supply node 314 is less than 3 volts. The output of comparator 310 is connected to control logic 316 to provide signal VOVER1. Control logic 316 is connected to over-voltage switch 318. In the illustrated embodiment, when the voltage at input node 300 is greater than a maximum operating voltage, which is the maximum voltage at which transceiver module 124 can operate reliably, comparator 310 asserts signal VOVER1. Control logic 316 in response to VOVER1 being asserted negates a control signal provided to over-voltage switch 318 to electrically decouple transceiver module 124 from input node 300.

In the illustrated example, FIG. 3 shows voltage detection module 200 having a second comparator 312. Comparator 312 is connected to power supply node 314. The inputs of comparator 312 are coupled to a node of the resistor tree between resistors 302 and 304 and a reference voltage module 308. As implemented comparator 312 acts as a 0.8 volt comparator relative to the system voltage at connector 104 of FIG. 1. The output of comparator 312 is connected to control logic 316. In the illustrated embodiment, when the voltage received at connector 104 is greater than a minimum operating voltage, where the minimum operating voltage is the lowest voltage at which transceiver module 124 can reliably conduct a data transfer session, comparator 312 asserts VOVER2. When the voltage received at connector 104 is less than the minimum operating voltage, comparator 312 negates VOVER2, indicating an under-voltage state. If an under-voltage state is detected, control logic 316 signals over-voltage switch 316 to electrically decouple transceiver module 124 to input node 300. If no under-voltage state is detected, and no over-voltage state is detected, control logic 316 signals over-voltage switch 318 to electrically couple transceiver module 124 to input node 300.

Accordingly, control logic 316 electrically decouples transceiver module 124 from input node 300 in response to comparator 310 indicating that the voltage at input node 300 is greater than the maximum operating voltage, and electrically couples transceiver module 124 to input node 300 in response to comparator 310 indicating the voltage at input node 300 is less than a maximum operating voltage. Control logic 316 further more electrically decouples transceiver-module 124 from input node 300 in response to comparator 312 indicating the voltage at input node 300 is less than a minimum operating voltage.

In the illustrated example, an output of transceiver module 124 is connected to control logic 316 to allow the module to transmit a signal to control logic 316 to close over-voltage switch 318. This permits transceiver module 124 to initiate a data transfer session, where the transceiver-battery combination provide power to the common connection, as long as no over-voltage condition is present such as with a USB OTG session.

Figure 4:
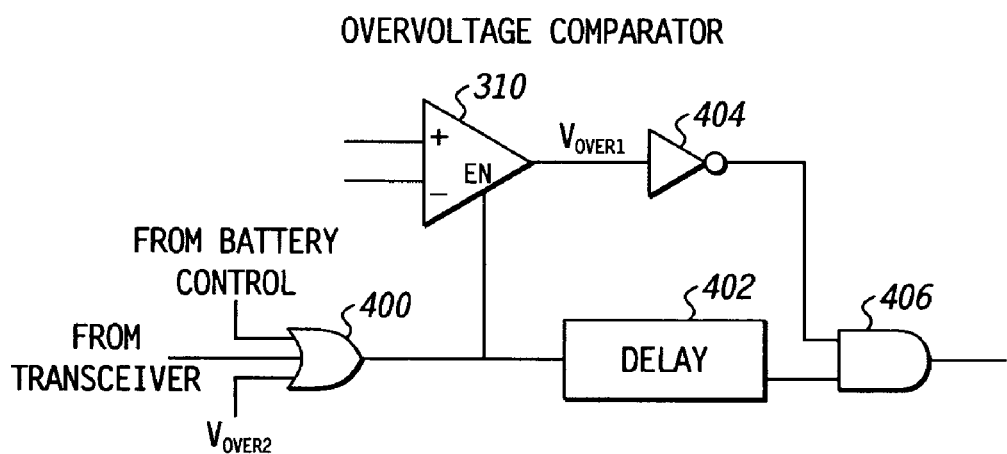
FIG. 4 is a block diagram of the control logic portion of FIG. 3, including a comparator, in accordance with a specific embodiment of the disclosure.

Referring now to FIG. 4, an exemplary implementation is illustrated for a portion of integrated circuit 112. In the illustrated example, OR gate 400, delay block 402, inverter 404, and gate 406 would be part of control logic 316. OR gate 400 has three inputs, the first input coupled to battery control module 108 that indicates when a battery charger has been attached to hand-held system 100, and is asserted when the voltage at bond pad 114 exceeds a predetermined voltage, such as 3.2 volts. The second input is coupled to transceiver 124, and receives a signal when a data transfer session has been initiated by the transceiver 124, such as during an OTG session. The third input is coupled to receive signal VOVER2, which is asserted when the output of comparator 312 indicates that the voltage at input node 300 exceeds a minimum operating voltage. The output of OR gate 400 provides the ENABLE signal described previously with respect to FIG. 2, and is connected to the input of delay block 402 and is also connected to an enable node of comparator 310. The output of comparator 310 is connected to the input of inverter 404. The outputs of inverter 404 and delay block 402 are connected to the inputs of AND gate 406. The output of AND gate 406 is connected to over-voltage switch 318.

In an exemplary operation, OR gate 400 receives inputs indicating three conditions: whether a battery charger has been connected to bond pad 114, whether a data transfer session has been initiated by transceiver 124, and whether the voltage at input node 300 exceeds a minimum operating voltage as determined by comparator 312. If any of these conditions hold true, OR gate 400 asserts a value indicating a true condition. An asserted signal will cause comparator 310 to operate by comparing its input signals. If comparator 310 determines that the voltage at input node 300 is greater than a maximum operating voltage, the output of comparator 310 will be asserted to indicate an over-voltage condition to inverter 404 which allows the inverter 404 and gate 406 combination to decouple transceiver circuitry 124 from input node 300.

If comparator 310 determines that the voltage at input node 300 is less than a first voltage, comparator 310 provides a negated signal that allows the output of AND gate 406 to be asserted. Delay block 402 delays the propagation of a signal from the output of OR gate 400 until comparator 310 has been able to perform its comparison. In the illustrated example, this delay ensures that after receiving an enable signal from OR gate 400, comparator 310 has sufficient time to complete its comparison and send the appropriate output to AND gate 406 thereby preventing a high-voltage spike from reaching the transceiver module 124. Accordingly, if OR gate 400 asserts an output indicating a true condition, delay block 402 asserts an output indicating a true condition after a delay.

In the illustrated example, therefore, if any of the three inputs to OR gate 400 are asserted and comparator 310 indicates that the voltage at input node 300 is less than a first voltage, after sufficient delay provided by delay block 402 AND gate 406 asserts a signal provided to over-voltage switch 318. Over-voltage switch 318 then couples transceiver circuitry 106 to input node 300.

Figure 5:
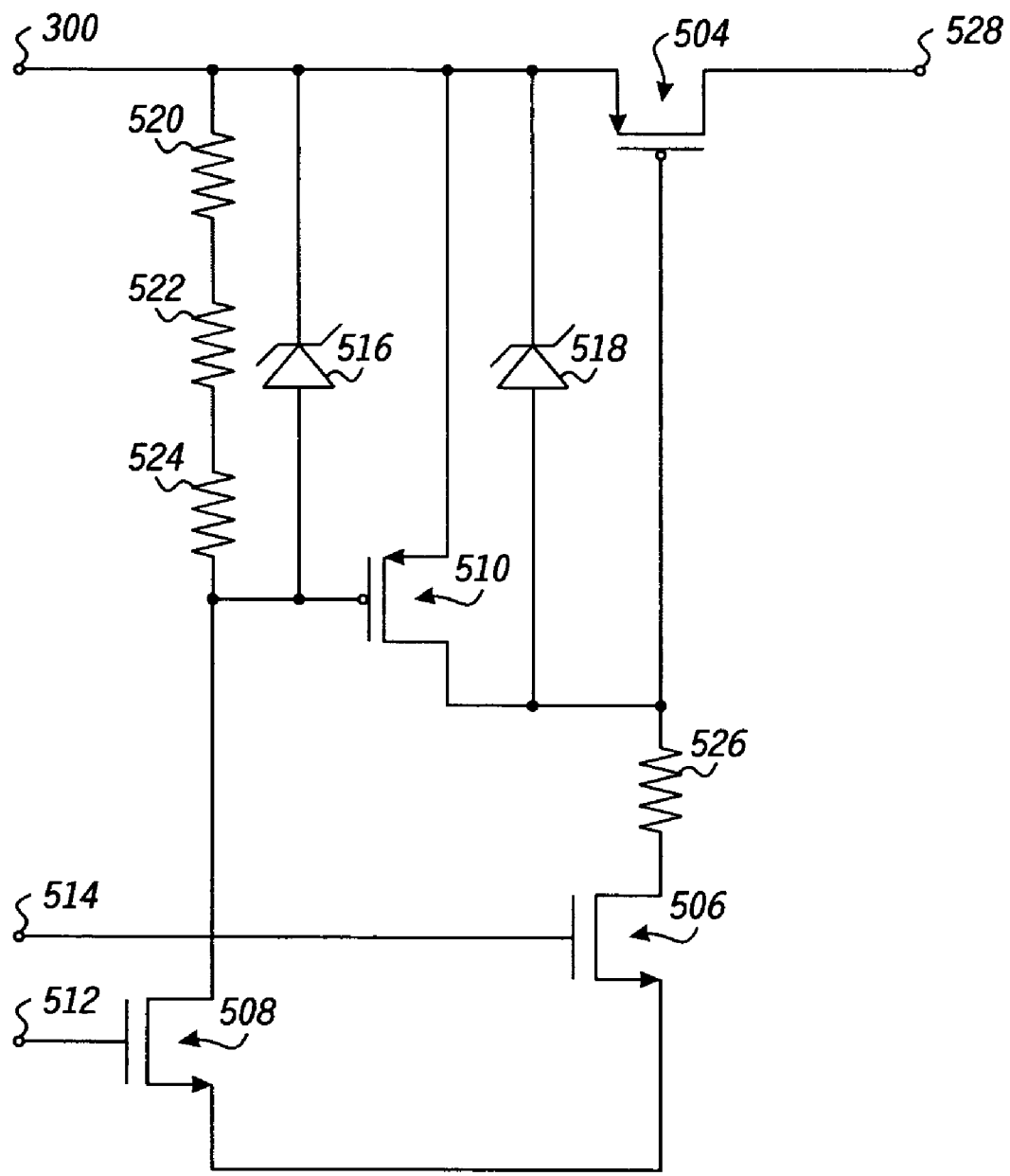
FIG. 5 is a circuit diagram of a possible embodiment of an over-voltage switch, in accordance with a specific embodiment of the disclosure.

Referring now to FIG. 5, an embodiment of over-voltage switch 318 is illustrated. In the illustrated example, over-voltage switch 318 includes input nodes 300, 512 and 514 and output node 528. These inputs are used to control transistors 504, 506, 508 and 510. The over-voltage switch 318 also includes diodes 516 and 518 to protect the switch transistors 502, 504, and 510 from over-voltages. Over-voltage switch 318 further includes resistors 520, 522, 524 and 526, which can also implement the resistor tree of FIG. 3 to ensure that safe voltages are applied to the various transistors.

In the illustrated example, transistors 506 and 508 are controlled by nodes 512 and 514. Nodes 512 and 514 are coupled to the output of control logic 316 and receive complementary signals. These complementary signals serve to control transistor 504 and thereby control whether the input at node 300 is electrically coupled to transceiver module 124 through output node 528 to power the transceiver module 124. Transistor 510 provides an appropriate bias level to the input of transistors 502 and 504 during operation. Transistor 502 is asserted to provide voltage reference information to the transceiver control module 26 to assist voltage regulation.

A method and system for protecting a transceiver module of an integrated circuit has been disclosed. A first aspect of the present disclosure comprises detecting a first voltage at a connector wherein at least a transceiver module portion of an integrated circuit is operable to be powered through the connector and electrically decoupling the transceiver module from the connector in response to the first detected voltage having a value greater than a first voltage value, the transceiver module to send and receive information external the integrated circuit.

One embodiment of this aspect further comprises disabling the operation of the transceiver module in response to the first detected voltage having a value greater than the first voltage value.

Another embodiment of this aspect further comprises powering the transceiver module through the connector prior to electrically decoupling the transceiver and powering the transceiver through a different connector coupled to a battery in response to the first detected voltage having a value greater than the first voltage value. In another embodiment the connector and the different connector are integrated circuit connectors.

Another embodiment of the first aspect of a disclosed method further comprises electrically coupling the transceiver module to the connector in response to the first voltage being less than the first voltage value. In another embodiment electrically decoupling further comprises electrically decoupling the transceiver module from the connector in response to the first voltage being less than a second voltage value, wherein the second voltage value is less than the first voltage value.

In another embodiment of the first aspect, electrically decoupling further comprises electrically decoupling the transceiver module from the connector in response to the first detected voltage being less than a second voltage value, wherein the second voltage value is less than the first voltage value.

In another embodiment, electrically decoupling the transceiver module results in the transceiver being powered down while other portions of the transceiver remain powered.

Another embodiment further comprises electrically coupling a system comprising the connector to an external voltage reference, wherein the external voltage reference is generated separate from the system and the first voltage is based upon a voltage of the external voltage reference. In an embodiment, the system comprises a mobile phone. In another embodiment, the system comprises a personal data assistant (PDA).

In another embodiment of the first aspect, the transceiver module is capable of communicating with universal serial bus (USB) systems and the connector comprises a USB VBUS connection. An embodiment further comprises electrically coupling the transceiver module to the connector in response to a USB on-the-go (OTG) session being initiated.

In yet another embodiment of the first aspect, the connector is a connector of the integrated circuit.

A second aspect of the present disclosure comprises a connector, an integrated circuit, comprising a transceiver module comprising an input to provide a supply voltage to at least a portion of the transceiver module, a first comparator comprising an input coupled to the connector and an output to indicate when a voltage at the connector is greater than a first voltage and a control module comprising a first input coupled to the output of the first comparator, a second input coupled to the connector, and an output coupled to the transceiver module wherein the output is electrically decoupled from the second input in response to the first comparator indicating the voltage at the connector is greater than the first voltage, and the output is electrically coupled to the connector in response to the first comparator indicating the voltage at the connector is less than the first voltage.

In an embodiment the system further comprises a second comparator comprising an input coupled to the connector and an output to indicate when the voltage at the connector is less than a second voltage and the control module further comprises a third input coupled to the output of the second comparator and the output of the control module is electrically decoupled from the connector in response to the second comparator indicating the voltage at the connector is less than the second voltage, wherein the second voltage is less than the first voltage.

In another embodiment the transceiver module is capable of communicating with universal serial bus (USB) systems, and the control module further comprises a third input coupled to the transceiver module to receive an indication when a USB OTG session has been initiated wherein the output is electrically coupled to the second input in response to receiving at the third input the indication that a USB on-the-go (OTG) session has been initiated.

In yet another embodiment the system comprises a cell phone integrated circuit. In another embodiment the system comprises a personal data assistant (PDA) integrated circuit.

A third aspect of the present disclosure comprises detecting a first voltage at a connector of an integrated circuit wherein at least a portion of the integrated circuit is operable to be powered through the connector and electrically decoupling a transceiver module from the connector in response to the first detected voltage having a value greater than a first voltage value, the transceiver module to send and receive information external the integrated circuit, wherein electrically decoupling the transceiver module results in the transceiver being powered down while other portions of the transceiver remain powered.

Principles regarding the disclosure have been described above in connection with specific embodiments. However, one of ordinary skill in the art appreciates that one or more modifications or one or more other changes can be made without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that can cause any benefit, advantage, or solution to occur or become more pronounced is not to be construed as a critical, required, or essential feature or element of any or all the claims.

What is claimed is:

1. A method comprising:
   detecting a first voltage at a connector wherein at least a transceiver module portion of an integrated circuit is operable to be powered through the connector;
   electrically decoupling the transceiver module from the connector in response to the first detected voltage having a value greater than a first voltage value, the transceiver module to send and receive information external the integrated circuit; and
   powering the transceiver module through the connector prior to electrically decoupling the transceiver and powering the transceiver through a different connector coupled to a battery in response to the first voltage having a value greater than the first voltage value.

2. The method of claim 1, further comprising:
   disabling the operation of the transceiver module in response to the first detected voltage having a value greater than the first voltage value.

3. The method of claim 1, wherein the connector and the different connector are external connectors of the integrated circuit.

4. The method of claim 1, further comprising:
   electrically coupling the transceiver module to the connector in response to the first voltage being less than the first voltage value.

5. The method of claim 4 wherein electrically decoupling further comprises electrically decoupling the transceiver module from the connector in response to the first voltage being less than a second voltage value, wherein the second voltage value is less than the first voltage value.

6. The method of claim 1 wherein electrically decoupling further comprises electrically decoupling the transceiver module from the connector in response to the first voltage being less than a second voltage value, wherein the second voltage value is less than the first voltage value.

7. The method of claim 1 wherein electrically decoupling the transceiver module results in the transceiver being powered down while other portions of the integrated circuit remain powered.

8. The method of claim 1 further comprising:
electrically coupling a system comprising the connector to an external voltage reference, wherein the external voltage reference is generated separate from the system and the first voltage is based upon a voltage of the external voltage reference.

9. The method of claim 8, wherein the system comprises a mobile phone.

10. The method of claim 8, wherein the system comprises a personal data assistant (PDA).

11. The method of claim 1 wherein the transceiver module is capable of communicating with universal serial bus (USB) systems and the connector comprises a USB VBUS connection.

12. The method of claim 11, further comprising:
electrically coupling the transceiver module to the connector in response to a USB on-the-go (OTG) session being initiated.

13. The method of claim 1, wherein the connector is a connector of the integrated circuit.

14. A system, comprising:
a connector;
an integrated circuit, comprising,
a transceiver module comprising an input to provide a supply voltage to at least a portion of the transceiver module;
a first comparator comprising an input coupled to the connector and an output to indicate when a voltage at the connector is greater than a first voltage; and
a control module comprising a first input coupled to the output of the first comparator, a second input coupled to the connector, a third input coupled to the output of a second comparator and an output coupled to the transceiver module wherein the output is electrically decoupled from the second input in response to the first comparator indicating the voltage at the connector is greater than the first voltage, and the output is electrically coupled to the connector in response to the first comparator indicating the voltage at the connector is less than the first voltage and the output is electrically decoupled from the connector in response to the second comparator indicating the voltage at the connector is less than the second voltage, wherein the second voltage is less than the first voltage.

15. The system of claim 14, wherein the transceiver module is capable of communicating with universal serial bus (USB) systems, and the control module further comprises a third input coupled to the transceiver module to receive an indication when a USB OTG session has been initiated wherein the output is electrically coupled to the second input in response to receiving at the third input the indication that a USB on-the-go (OTG) session has been initiated.

16. The system of claim 14, wherein the system comprises a cell phone integrated circuit.

17. The system of claim 14, wherein the system comprises a personal data assistant (PDA) integrated circuit.

18. A system, comprising:
a connector;
an integrated circuit, comprising,
a transceiver module comprising an input to receive a supply voltage to power at least a portion of the transceiver module;
a first comparator comprising an input coupled to the connector and an output to indicate when a voltage at the connector is greater than a first voltage; and
a control module comprising a first input coupled to the output of the first comparator, a second input coupled to the connector, and an output coupled to the transceiver module wherein the output is electrically decoupled from the second input in response to the first comparator indicating the voltage at the connector is greater than the first voltage, and the output is electrically coupled to the connector in response to the first comparator indicating the voltage at the connector is less than the first voltage;
wherein the transceiver module is capable of communicating with universal serial bus (USB) systems, and the control module further comprises a third input coupled to the transceiver module to receive an indication when a USB OTG session has been initiated wherein the output is electrically coupled to the second input in response to receiving at the third input the indication that a USB on-the-go (OTG) session has been initiated.

19. A method comprising:
detecting a first voltage at a connector wherein at least a transceiver module portion of an integrated circuit is operable to be powered through the connector, wherein the transceiver module is capable of communicating with universal serial bus (USB) systems and the connector comprises a USB VBUS connection;
electrically decoupling the transceiver module from the connector in response to the first detected voltage having a value greater than a first voltage value, the transceiver module to send and receive information external the integrated circuit; and
electrically coupling the transceiver module to the connector in response to a USB on-the-go (OTG) session being initiated.

* * * * *